(12) United States Patent
Kobayashi et al.

(10) Patent No.: US 8,815,128 B2
(45) Date of Patent: Aug. 26, 2014

(54) OXIDIZING LIQUID FOR CHEMILUMINESCENCE AND CHEMILUMINESCENCE SYSTEM USING SAME

(75) Inventors: Masataka Kobayashi, Fukuoka (JP); Hiroyuki Sano, Fukuoka (JP)

(73) Assignee: Lumica Corporation, Fukuoka (JP)

( * ) Notice: Subject to any disclaimer, the term of this patent is extended or adjusted under 35 U.S.C. 154(b) by 72 days.

(21) Appl. No.: 13/577,740

(22) PCT Filed: Jan. 27, 2011

(86) PCT No.: PCT/JP2011/051641
§ 371 (c)(1),
(2), (4) Date: Aug. 8, 2012

(87) PCT Pub. No.: WO2011/099375
PCT Pub. Date: Aug. 18, 2011

(65) Prior Publication Data
US 2012/0326087 A1      Dec. 27, 2012

(30) Foreign Application Priority Data
Feb. 9, 2010 (JP) ................................. 2010-026938

(51) Int. Cl.
*C09K 11/07* (2006.01)
*C09K 3/00* (2006.01)
*F21K 2/06* (2006.01)

(52) U.S. Cl.
CPC .. *F21K 2/06* (2013.01); *C09K 11/07* (2013.01)
USPC .................. 252/700; 252/186.43; 252/301.16

(58) Field of Classification Search
USPC ........................................................ 252/700
See application file for complete search history.

(56) References Cited

U.S. PATENT DOCUMENTS

| 5,597,517 A | 1/1997 | Chopdekar et al. |
| 2004/0238803 A1 | 12/2004 | Yamate |
| 2008/0185562 A1 | 8/2008 | Chen et al. |
| 2008/0246009 A1 | 10/2008 | Fujita et al. |
| 2009/0166595 A1 * | 7/2009 | Schrimmer et al. .......... 252/700 |
| 2012/0126188 A1 * | 5/2012 | Schrimmer ................... 252/700 |

FOREIGN PATENT DOCUMENTS

| CN | 1217010 | 5/1999 | |
| CN | 101240165 | 8/2008 | |
| JP | 2002-138278 | 5/2002 | |
| JP | 2004-331947 | 11/2004 | |
| JP | 2006-104266 | 4/2006 | |
| JP | 2011-137134 | 7/2011 | |
| WO | WO 9419421 A1 * | 9/1994 | ............... C09K 3/00 |
| WO | 2005/103196 | 11/2005 | |

OTHER PUBLICATIONS

International Search Report issued Mar. 22, 2011 in International (PCT) Application No. PCT/JP2011/051641, of which the present application is the national stage.
Office Action issued Oct. 30, 2013 in Chinese Application No. 201180008898.1.

* cited by examiner

*Primary Examiner* — Vu A Nguyen
(74) *Attorney, Agent, or Firm* — Wenderoth, Lind & Ponack L.L.P.

(57) ABSTRACT

Provided are an oxidizing liquid for a chemiluminescent material, which has a flash point higher than that of a conventional oxidizing liquid and also has high safety while maintaining the level of chemiluminescent performance; and a chemiluminescence system. Disclosed are an oxidizing liquid for a chemiluminescent material, which produces a chemiluminescence phenomenon when mixed with a fluorescent liquid containing an oxalic acid ester and a fluorescent substance, includes hydrogen peroxide and a solvent and has a flash point of 60° C. or higher, wherein a solvent to be contained in the oxidizing liquid is a mixture of at least two compounds other than phthalate compounds; and a chemiluminescence system using the oxidizing liquid and a fluorescent liquid.

8 Claims, No Drawings

OXIDIZING LIQUID FOR CHEMILUMINESCENCE AND CHEMILUMINESCENCE SYSTEM USING SAME

TECHNICAL FIELD

The present invention relates to an oxidizing liquid for chemiluminescence and a chemiluminescence system using the oxidizing liquid for chemiluminescence. More specifically, the invention relates to a specific solvent-containing oxidizing liquid for chemiluminescence and a chemiluminescence system using the oxidizing liquid for chemiluminescence and a fluorescent liquid for chemiluminescence.

BACKGROUND ART

A number of products using chemiluminescence have already been placed on the market. Generally, using such products, chemiluminescence is induced at a desired time by mixing a solution (fluorescent liquid) containing an oxalic acid ester and a fluorescent substance (dye) with a solution (oxidizing liquid) containing an oxidizing agent (generally hydrogen peroxide) and a catalyst component (e.g., a salicylate), and subjected to the purpose.

Such fluorescent and oxidizing liquids are produced using solvents for adjusting the concentration of the components and allowing reactive species in both liquids to mix uniformly and react with each other. For example, the Patent Document 1 discloses a fluorescent liquid in which an aromatic solvent such as a phthalic acid ester or a benzoic acid ester is used.

In recent years, however, it has been pointed out that such aromatic solvents have a problem with safety. In particular, phthalate solvents have been suspected of being environmental hormones, and therefore, there have been a movement to regulate them in Europe and other countries. Many children have many opportunities to use chemiluminescent materials as toys, and therefore, there has been a demand for highly safe fluorescent and oxidizing liquids for chemiluminescent materials using a non-aromatic solvent. The Patent Document 2 discloses that citric acid esters are used as a solvent for a fluorescent liquid or an oxidizing liquid using such a non-aromatic solvent.

On the other hand, in recent years, safe solvents have also been required for fire prevention. Conventionally, a solution produced by mixing acetyl tributyl citrate (ATBC), benzyl benzoate (BeB), and dipropylene glycol dimethyl ether (DMM) is frequently used as a solvent for fluorescent liquid composition. These solvents each have a high flash point, and a mixture of them also has a flash point of 100° C. or higher.

However, a conventional solution used as an oxidizing liquid exhibits a low flash point of about 20° C. to 40° C., because it contains an alcohol such as ethanol regardless of whether it is a phthalate or non-phthalate solution. Such an oxidizing liquid for a chemiluminescent composition has a low flash point, and therefore it is strictly handled as a dangerous material and has problems such as regulations applied to it in air cargo.

PRIOR ART DOCUMENTS

Patent Documents

Patent Document 1: JP 2002-138278 A
Patent Document 2: JP 2006-104266 A

SUMMARY OF THE INVENTION

Problems to be Solved by the Invention

In view of these circumstances, the object of the present invention is to provide a phthalate compound-free oxidizing liquid for chemiluminescence, which has a higher level of safety for fire prevention than conventional without being reduced in chemiluminescent performance.

Means for Solving the Problem

The present inventors have made earnest studies on suitable solvents for an oxidizing liquid from the viewpoints of both fire prevention performance and luminescent performance such as emission luminance. As a result, the inventors have accomplished the invention based on the finding that an oxidizing liquid that satisfies these requirements can be obtained using a mixture of two or more specific solvents.

Thus, the present invention is directed to the following aspects (1) to (5).

(1) An oxidizing liquid for a chemiluminescent material, which produces a chemiluminescence phenomenon when mixed with a fluorescent liquid containing an oxalic acid ester and a fluorescent substance, comprises hydrogen peroxide and a solvent and has a flash point of 60° C. or higher, wherein a solvent to be contained in the oxidizing liquid is a mixture of at least two compounds other than phthalate compounds.

(2) The oxidizing liquid for a chemiluminescent material according to (1), which has a flash point of 70° C. or higher.

(3) The oxidizing liquid for a chemiluminescent material according to (1) or (2), wherein the solvent of the oxidizing liquid is a mixture of at least two selected from triethyl citrate, acetyl tributyl citrate, benzyl benzoate, 3-methoxy-3-methylbutanol, hexylene glycol, propylene glycol, butyrolactone, polyethylene glycol, triethylene glycol, triacetin, diethylene glycol diethyl ether, sebacic acid, diethylene glycol dimethyl ether, and dipropylene glycol dimethyl ether.

(4) The oxidizing liquid for a chemiluminescent material according to (1) or (2), wherein the solvent of the oxidizing liquid is a mixture of at least one selected from triethyl citrate, acetyl tributyl citrate, and benzyl benzoate; and at least one selected from 3-methoxy-3-methylbutanol, hexylene glycol, propylene glycol, butyrolactone, polyethylene glycol, triethylene glycol, triacetin, diethylene glycol diethyl ether, sebacic acid, diethylene glycol dimethyl ether, and dipropylene glycol dimethyl ether.

(5) A chemiluminescence system, comprising the oxidizing liquid for a chemiluminescent material according to any one of (1) to (4); and a fluorescent liquid containing an oxalic acid ester and a fluorescent substance.

Effects of the Invention

Like a fluorescent liquid for a chemiluminescent material, the oxidizing liquid of the invention for a chemiluminescent material has a flash point higher than that of the conventional oxidizing liquid, and provides a highly safe chemiluminescence system while maintaining the level of chemiluminescent performance.

EMBODIMENTS FOR CARRYING OUT THE INVENTION

Hereinafter, the present invention will be described in detail. First, the invention is directed to an oxidizing liquid for a chemiluminescent material, which produces a chemiluminescence phenomenon when mixed with a fluorescent liquid containing an oxalic acid ester and a fluorescent substance, contains hydrogen peroxide and a solvent, and has a flash point of 60° C. or higher.

The oxidizing liquid of the present invention for a chemiluminescent material (hereinafter, also simply referred to as "oxidizing liquid") has an action of producing a chemiluminescence phenomenon when it is mixed with a fluorescent liquid for a chemiluminescent material (hereinafter, also simply referred to as "fluorescent liquid"), which contains an oxalic acid ester and a fluorescent substance (luminescent agent). The oxidizing liquid contains hydrogen peroxide, which is an essential component to serve as an oxidizing agent, and also contains a solvent for increasing the solubility of a salicylate or any other salt, the solvent being added to adjust the concentration of the hydrogen peroxide, to improve the compatibility (miscibility) with the luminescent agent in the fluorescent liquid described below, and to improve luminous efficiency.

A feature of the present invention is that the oxidizing liquid has a flash point of 60° C. or higher, preferably 70° C. or higher, and in particular, preferably 100° C. or higher to be used.

As used herein, the term "flash point" refers to a value measured by the rapid equilibrium closed cup method provided in JIS K 2265-2.

An oxidizing liquid having a flash point of less than 60° C. does not comply with cargo regulations of the aviation law and is handled as a dangerous object in international mailing. However, the oxidizing liquid of the invention, which has a flash point of 60° C. or higher, is advantageous in that it complies with cargo regulations of the aviation law.

In addition, when the oxidizing liquid of the invention has a flash point of 70° C. or higher, it complies with the class III petroleum requirements (70 to 200° C.) for dangerous products under the Fire Defense Law, which means that it has one rank higher safety.

In addition, when the oxidizing liquid of the invention has a flash point of 100° C. or higher, it has significantly higher safety for fire prevention.

A further feature is that the oxidizing liquid does not contain any phthalate compound as a solvent. Phthalate compounds have been discussed and suspected of being environmental hormones as mentioned above, and therefore, are excluded so that a safer oxidizing liquid and a safer luminescence system can be formed.

Specific examples of the solvent to be contained in the oxidizing liquid of the present invention include triethyl citrate (flash point: 151° C.), acetyl tributyl citrate (flash point: 204° C.), benzyl benzoate (flash point: 148° C.), 3-methoxy-3-methylbutanol (flash point: 67° C.), hexylene glycol (flash point: 96° C.), propylene glycol (flash point: 99° C.), butyrolactone (flash point: 98° C.), polyethylene glycol (flash point: 171 to 235° C.), triethylene glycol (flash point: 177° C.), triacetin (flash point: 148° C.), diethylene glycol diethyl ether (flash point: 71° C.), diethylene glycol monomethyl ether (flash point: 93° C.), diethylene glycol monoethyl ether (flash point: 96° C.), triethylene glycol dimethyl ether (flash point: 113° C.), ethylene glycol isopropyl ether (flash point: 44° C.), diethylene glycol dibutyl ether (flash point: 118° C.), sebacic acid (flash point: 220° C.), diethylene glycol dimethyl ether (flash point: 58° C.), and dipropylene glycol dimethyl ether (flash point: 60° C.).

These solvents have high ability to easily dissolve hydrogen peroxide as an oxidizing agent and a salicylate as a catalyst, and also have high compatibility with a fluorescent liquid containing a fluorescent substance.

A mixture of two or more of these solvents is used, and the solvent mixture (oxidizing liquid) has a flash point of 60° C. or higher. In view of fire-resistant properties, such solvents preferably each have a flash point of 60° C. or higher, more preferably 70° C. or higher, and in particular, preferably 100° C. or higher.

Among the above solvents, preferred is a mixture of at least two selected from triethyl citrate, acetyl tributyl citrate, benzyl benzoate, 3-methoxy-3-methylbutanol, hexylene glycol, propylene glycol, butyrolactone, polyethylene glycol, triethylene glycol, triacetin, diethylene glycol diethyl ether, sebacic acid, diethylene glycol dimethyl ether, and dipropylene glycol dimethyl ether.

In particular, the oxidizing liquid is preferably a mixture of at least one solvent (solvent A) selected from triethyl citrate, acetyl tributyl citrate, and benzyl benzoate; and at least one solvent (solvent B) selected from 3-methoxy-3-methylbutanol, hexylene glycol, propylene glycol, butyrolactone, polyethylene glycol, triethylene glycol, triacetin, diethylene glycol diethyl ether, sebacic acid, diethylene glycol dimethyl ether, and dipropylene glycol dimethyl ether.

In particular, the solvent A is preferably triethyl citrate or benzyl benzoate. In particular, triacetin, 3-methoxy-3-methylbutanol, or hexylene glycol is preferably used as the solvent B.

The mixing ratio of the solvents is appropriately determined depending on the intended use of the final product or the safety or other properties required of the final product. When a mixture of the solvents A and B is used, the ratio (% by volume) of the solvent A to the solvent B is generally 1 to 99:99 to 1, preferably 10 to 90:90 to 10, and more preferably 20 to 80:80 to 20.

If the above solvent is used alone, it would be difficult to form an oxidizing liquid at the same or higher level of compatibility with hydrogen peroxide as an oxidizing agent or a salicylate as a catalyst or at the same or higher level of compatibility with a fluorescent liquid containing a fluorescent substance, as compared with the case where a lower alcohol that is conventionally used such as ethanol or butanol is used.

In any combination of the solvents, the solvent A such as triethyl citrate or benzyl benzoate is a prime solvent for the oxidizing liquid, and the solvent B such as 3-methoxy-3-methylbutanol or hexylene glycol functions as an auxiliary solvent, so that both solvents work together to form an oxidizing liquid with high luminescent performance.

While the ratio between the amount of hydrogen peroxide and the amount (total amount) of the solvents in the oxidizing liquid may be appropriately selected depending on the purpose of use, the concentration of hydrogen peroxide is generally 0.5 to 10% by weight, and preferably 3 to 6% by weight.

In general, the oxidizing liquid for a chemiluminescent material desirably contains a small amount (generally 0.001 to 0.1% by weight) of salicylic acid or a derivative thereof, such as lithium salicylate, lithium tert-butyl salicylate, sodium salicylate, or salicylic acid tetraalkyl ammonium salt, as a general catalyst component.

Next, a description will be given of the fluorescent liquid of the present invention for a chemiluminescent material. The fluorescent liquid contains an oxalic acid ester, a fluorescent substance, and a solvent, and produces a chemiluminescence phenomenon when mixed with an oxidizing liquid containing hydrogen peroxide.

The oxalic acid ester (oxalate) for use in the invention may be an oxalic acid derivative such as a halide of oxalic acid, an oxalate ester, or oxalic oxamide. Typical examples of the oxalate include bis(2,4,5-trichloro-6-carbobutoxyphenyl)oxalate and bis(2,4,5-trichloro-6-carbopentoxyphenyl)oxalate.

The fluorescent substance may be any fluorescent compound that has an emission spectrum from 300 to 1,200 nm and is at least partially soluble in the solvent. Examples of such a fluorescent compound include fused ring-containing conjugated polycyclic aromatic compounds such as anthracene, substituted anthracene, benzanthracene, phenanthrene, substituted phenanthrene, naphthacene, substituted naphthacene, pentacene, substituted pentacene, perylene, substituted perylene, violanthrone, and substituted violanthrone. These compounds may have any substituent as long as it does not interfere with the luminescent reaction, and examples of such a substituent include a phenyl group, a lower alkyl group, a chloro group, a bromo group, a cyano group, an alkoxy group, and a phenylnaphthyl group.

Specific examples of the fluorescent substance include 2-chloro-9,10-bis(4-methylethynyl)anthracene, 9,10-bis(phenylethynyl)anthracene, 1-methoxy-9,10-bis(phenylethynyl)anthracene, perylene, 1,5-dichloro-9,10-bis(phenylethynyl)anthracene, 1,8-dichloro-9,10-bis(phenylethynyl)anthracene, monochloro- and dichloro-substituted 9,10-bis(phenylethynyl)anthracene, 5,12-bis(phenylethynyl)tetracene, 9,10-diphenylanthracene, 16,17-dihexyloxyviolanthrone, 2-methyl-9,10-bis-(phenylethynyl)anthracene, 9,10-bis-(4-methoxyphenyl)-2-chloroanthracene, 9,10-bis-(4-ethoxyphenyl)-2-chloroanthracene, 5,12-bis-(phenylethynyNaphthacene, 5,6,11,12-tetraphenylnaphthacene (rubrene), and mixtures thereof.

Examples of such fluorescent substance products which are preferably used include LUMOGEN RED (product name, manufactured by BASF, a red color-emitting perylene dicarboximide fluorescent agent), LUMOGEN YELLOW (product name, manufactured by BASF, a yellow color-emitting perylene dicarboximide fluorescent agent), and LUMOGEN ORANGE (product name, manufactured by BASF, an orange color-emitting perylene dicarboximide fluorescent agent).

In the fluorescent liquid according to the present invention, acetyl tributyl citrate (ATBC), benzyl benzoate (BeB), dipropylene glycol dimethyl ether (DMM), and the like are generally used alone or in any combination as a solvent. In the invention, the fluorescent liquid is not particularly limited as long as it has a flash point equal to or higher than the flash point required of the oxidizing liquid (60° C.).

In the invention, any phthalic acid ester such as dimethyl phthalate or dibutyl phthalate is not used as a solvent not only for the oxidizing liquid but also for the fluorescent liquid.

The composition ratio of each component in the fluorescent liquid may be freely selected depending on the purpose of use. In general, the ratio (molar ratio) of the amount of the oxalic acid ester to the amount of the fluorescent substance is preferably from 20:1 to 40:1, while the amounts should be enough to produce chemiluminescence. The ratio between the amounts of the solvent and the oxalic acid ester may also be selected depending on the purpose of use. In general, the solvent should be used in such an amount that the concentration of the oxalic acid ester will be from 0.01 to 0.5 moles/liter, and preferably from 0.05 to 0.3 moles/liter.

If necessary, an additive such as a surfactant may be added to the oxidizing liquid or the fluorescent liquid in a range without deteriorating the concept of the present invention. When used, the oxidizing liquid or the fluorescent liquid may also be supported on a substrate for light emission, such as a nonwoven fabric, a woven fabric, or a glass or plastic material.

The oxidizing liquid of the present invention for a chemiluminescent material produces a chemiluminescence phenomenon when mixed with the fluorescent liquid for a chemiluminescent material, which contains the oxalic acid ester and the fluorescent substance. That is, the oxidizing liquid of the invention is used in combination with the fluorescent liquid to form a chemiluminescence system.

When a substrate for light emission is used, the chemiluminescence system may be one in which the catalyst component and the fluorescent substance are supported on the substrate for light emission, and the other solutions are in contact with the catalyst component and the fluorescent substance.

The oxidizing liquid of the invention and the chemiluminescence system using the same have high chemiluminescent performance and can provide a highly safe system.

EXAMPLES

Hereinafter, the present invention will be more specifically described with reference to Examples, however, the invention is not limited thereto.

Each solvent used and shown in Table 1 below is abbreviated as follows: triethyl citrate (TEC), benzyl benzoate (BeB), 3-methoxy-3-methylbutanol (MMB), hexylene glycol (HG), acetyl tributyl citrate (ATBC), propylene glycol (PPG), butyrolactone (BL), polyethylene glycol (PEG), triethylene glycol (TEG), triacetin (TA), diethylene glycol diethyl ether (EGDEE), sebacic acid (DES), dipropylene glycol dimethyl ether (DMM).

Common components contained in oxidizing liquids are hydrogen peroxide (3 wt %) and sodium salicylate (2.0 mM).

Method for Measuring Emission Luminance (in units of $cd/m^2$)

The emission luminance was measured with a luminance meter (LS-100, manufactured by KONICA MINOLTA HOLDINGS, INC.) by the method described below.

In a dark room, a transparent vessel was placed at such a distance from the luminance meter that the measurement field of view of the luminance mater was satisfied. To the vessel were added 1 ml of a fluorescent liquid and 1 ml of an oxidizing liquid, and vigorously stirred using a small-sized stirring homogenizer. In this process, the highest value of intensity was recorded as the emission luminance immediately after the start of reaction. Subsequently, the device and the sample were allowed to stand for 5 minutes, and then the emission luminance was measured again.

Method for Measuring Flash Point (in Units of ° C.)

The flash point was measured with a flash point tester (Model 33000-0JIS, manufactured by Tanaka Scientific Limited) by the Seta closed cup method according to JIS K 2265-2 (rapid equilibrium closed cup method).

Example 1

(1) Preparation of Fluorescent Liquid (Emitting Green Color) for Use in Examination of Oxidizing Liquid (Emission Luminance Comparison Test)

To 70 parts by volume of acetyl tributyl citrate (ATBC) were added 20 parts by volume of benzyl benzoate (BeB) and 10 parts by volume of dipropylene glycol dimethyl ether (DMM), and the mixture was exposed to nitrogen gas while heated at 100° C. While this process was continued, 2 mM equivalent of bis(2,4,5-trichloro-6-carbopentoxyphenyl)oxalate (CPPO) was added to the mixture and dissolved completely. To the mixture was further added 10 mM of 9,10-bis(phenylethynyNnthracene (BPEA) as a luminescent dye, and dissolved completely. The solution was allowed to cool and then allowed to pass through a column packed with molecular sieves. The resulting solution was used as a fluorescent liquid (emitting green color).

(2) Preparation of Oxidizing Liquid (TEC (70), EGDEE (30))

To 70 parts by volume of TEC was added 30 parts by volume of EGDEE, and 2.0 mM of sodium salicylate was added to the mixture and dissolved completely. To the mixture was further added hydrogen peroxide water in an amount equivalent to 3 parts by weight of hydrogen peroxide, and stirred, so that an oxidizing liquid was obtained. The blending composition and flash point of the oxidizing liquid are shown in Table 1.

(3) Measurement of Emission Luminance

The fluorescent liquid (1) and the oxidizing liquid (2) were mixed by stirring, and the emission luminance of the mixture was measured after the start of reaction and a lapse of 5 minutes by the above method for measuring the emission luminance. The results are shown together in Table 1.

Examples 2 to 10

The experiment was carried out in the same manner as in the Example 1, except that the solvent for forming the oxidizing liquid and the composition ratio were changed as shown in Table 1, and the emission luminance was measured. The results are shown together in Table 1.

Comparative Example 1

The experiment was carried out in the same manner as in Example 1, except that only TEC was used as the solvent for the oxidizing liquid, and the emission luminance was measured. The results are shown together in Table 1.

Comparative Example 2

The experiment was carried out in the same manner as in Example 1, except that TEC and ethanol (EtOH) were used as the solvents to form the oxidizing liquid as shown in Table 1, and the emission luminance was measured. The results are shown together in Table 1.

The results apparently indicate the following. When only TEC was used as the solvent, the solubility of sodium salicylate used as a catalyst was relatively low, so that the emission luminance was found to be low both immediately after the start of reaction and 5 minutes after the start of reaction.

In Comparative Example 2 where the solution of a mixture of TEC and ethanol was used, the oxidizing liquid had a flash point as low as 37° C., although the emission luminance was sufficient.

On the other hand, it was found that the emission luminance produced with the oxidizing liquid of each of Examples 1 to 10 was equal to or higher than that produced with the oxidizing liquid containing the mixed solution of TEC and ethanol as the solvent and that the oxidizing liquid of each of Examples 1 to 10 exhibited a flash point of 60° C. or higher.

INDUSTRIAL APPLICABILITY

The oxidizing liquid of the present invention for a chemiluminescent material, which has a flash point higher than that of conventional oxidizing liquids, provides a highly safe chemiluminescence system while maintaining the level of chemiluminescent performance.

The invention claimed is:
1. An oxidizing liquid for a chemiluminescent material, which produces a chemiluminescence phenomenon when mixed with a fluorescent liquid containing an oxalic acid ester and a fluorescent substance, comprises hydrogen peroxide and a solvent and has a flash point of 60° C. or higher, wherein
a solvent to be contained in the oxidizing liquid is a mixture of at least one selected from triethyl citrate and benzyl benzoate; and at least one selected from 3-methoxy-3-methylbutanol, hexylene glycol, propylene glycol, butyrolactone, triacetin, diethylene glycol diethyl ether, diethylene glycol monomethyl ether, diethylene glycol monoethyl ether, diethylene glycol dimethyl ether, and dipropylene glycol dimethyl ether.
2. The oxidizing liquid for a chemiluminescent material according to claim 1, which has a flash point of 70° C. or higher.

TABLE 1

|  | Composition 1 (vol %) | Composition 2 (vol %) | Composition 3 (vol %) | Composition 4 (vol %) | Emission luminance (cd/m²) | | Flash point (° C.) Seta closed cup method JIS K 2265-2 |
|---|---|---|---|---|---|---|---|
|  |  |  |  |  | Immediately after start of reaction | 5 minutes after start of reaction |  |
| Example 1 | TEC(70) | EGDEE(30) | — | — | 682.4 | 98.5 | 84 |
| Example 2 | TEC(50) | HG(30) | BeB(20) | — | 700.2 | 87.6 | 100 |
| Example 3 | TEC(50) | MMB(30) | BeB(20) | — | 681.3 | 100.2 | 81 |
| Example 4 | TEC(50) | BeB(20) | HG(25) | PPG(5) | 690.7 | 95.4 | 100 |
| Example 5 | BL(50) | BeB(20) | HG(30) | — | 642.8 | 91.2 | 110 |
| Example 6 | ATBC(40) | BeB(20) | PPG(15) | BL(25) | 695.3 | 78.5 | 105 |
| Example 7 | TEC(25) | TA(25) | BeB(20) | HG(30) | 784.6 | 145.3 | 110 |
| Example 8 | TEC(25) | TA(25) | BeB(20) | MMB(30) | 758.5 | 136 | 87 |
| Example 9 | TA(50) | BeB(20) | HG(30) | — | 810.5 | 157.3 | 110 |
| Example 10 | TA(50) | BeB(20) | MMB(30) | — | 818.2 | 168.2 | 87 |
| Comparative Example 1 | TEC(100) | — | — | — | 231.40 | 45.6 | 151 |
| Comparative Example 2 | TEC(70) | EtOH(30) | — | — | 737.20 | 127.7 | 37 |

3. The oxidizing liquid for a chemiluminescent material according to claim 1, wherein the solvent to be contained in the oxidizing liquid is a mixture of at least one selected from triethyl citrate and benzyl benzoate; and at least one selected from 3-methoxy-3-methylbutanol, hexylene glycol, propylene glycol, butyrolactone, triacetin, diethylene glycol diethyl ether, diethylene glycol dimethyl ether, and dipropylene glycol dimethyl ether.

4. A chemiluminescence system, comprising:
the oxidizing liquid for a chemiluminescent material according to claim 1; and
a fluorescent liquid containing an oxalic acid ester and a fluorescent substance.

5. The oxidizing liquid for a chemiluminescent material according to claim 2, wherein the solvent to be contained in the oxidizing liquid is a mixture of at least one selected from triethyl citrate and benzyl benzoate; and at least one selected from 3-methoxy-3-methylbutanol, hexylene glycol, propylene glycol, butyrolactone, triacetin, diethylene glycol diethyl ether, diethylene glycol dimethyl ether, and dipropylene glycol dimethyl ether.

6. A chemiluminescence system, comprising:
the oxidizing liquid for a chemiluminescent material according to claim 2; and
a fluorescent liquid containing an oxalic acid ester and a fluorescent substance.

7. A chemiluminescence system, comprising:
the oxidizing liquid for a chemiluminescent material according to claim 3; and
a fluorescent liquid containing an oxalic acid ester and a fluorescent substance.

8. A chemiluminescence system, comprising:
the oxidizing liquid for a chemiluminescent material according to claim 5; and
a fluorescent liquid containing an oxalic acid ester and a fluorescent substance.

* * * * *